(12) United States Patent
Moore et al.

(10) Patent No.: US 11,789,949 B2
(45) Date of Patent: Oct. 17, 2023

(54) METHOD AND SYSTEM OF PERFORMING AN OPERATION ON A SINGLE-TABLE, MULTI-TENANT DATABASE AND PARTITION KEY FORMAT THEREFOR

(71) Applicant: Command Alkon Incorporated, Birmingham, AL (US)

(72) Inventors: Douglas A. Moore, Indian Springs, AL (US); Todd McPartlin, Bryan, TX (US)

(73) Assignee: Command Alkon Incorporated, Birmingham, AL (US)

( * ) Notice: Subject to any disclaimer, the term of this patent is extended or adjusted under 35 U.S.C. 154(b) by 94 days.

(21) Appl. No.: 17/355,589

(22) Filed: Jun. 23, 2021

(65) Prior Publication Data

US 2021/0406267 A1 Dec. 30, 2021

Related U.S. Application Data

(60) Provisional application No. 63/043,820, filed on Jun. 25, 2020.

(51) Int. Cl.
*G06F 16/2455* (2019.01)
*G06F 16/25* (2019.01)
*G06F 21/62* (2013.01)
*G06F 16/22* (2019.01)

(52) U.S. Cl.
CPC .... *G06F 16/24554* (2019.01); *G06F 16/2282* (2019.01); *G06F 16/252* (2019.01); *G06F 21/6227* (2013.01)

(58) Field of Classification Search
CPC .................................. G06F 16/24554
USPC .......................................... 707/737
See application file for complete search history.

(56) References Cited

U.S. PATENT DOCUMENTS

| | | | |
|---|---|---|---|
| 7,110,458 B2 * | 9/2006 | Divakaran | H04N 19/51 707/E17.058 |
| 9,167,207 B1 * | 10/2015 | Drewry | H04N 21/435 |
| 2005/0169470 A1 * | 8/2005 | Shimosato | H04L 9/0656 380/216 |
| 2016/0191509 A1 * | 6/2016 | Bestler | H04L 63/0876 713/193 |
| 2017/0046753 A1 * | 2/2017 | Deupree, IV | H04L 67/52 |
| 2017/0308558 A1 * | 10/2017 | Shams | G06F 16/273 |

* cited by examiner

Primary Examiner — Muluemebet Gurmu
(74) Attorney, Agent, or Firm — Wiley Rein

(57) ABSTRACT

A partition key format for allocating partitions to data items in a single table database, where the data items are owned by different entities. The partition key format including a sequence of a plurality of frames, wherein a first of said frames is an identifier of the requesting entity (EID), and a second one of said frames is an identifier of the type of data item (TID).

23 Claims, 4 Drawing Sheets

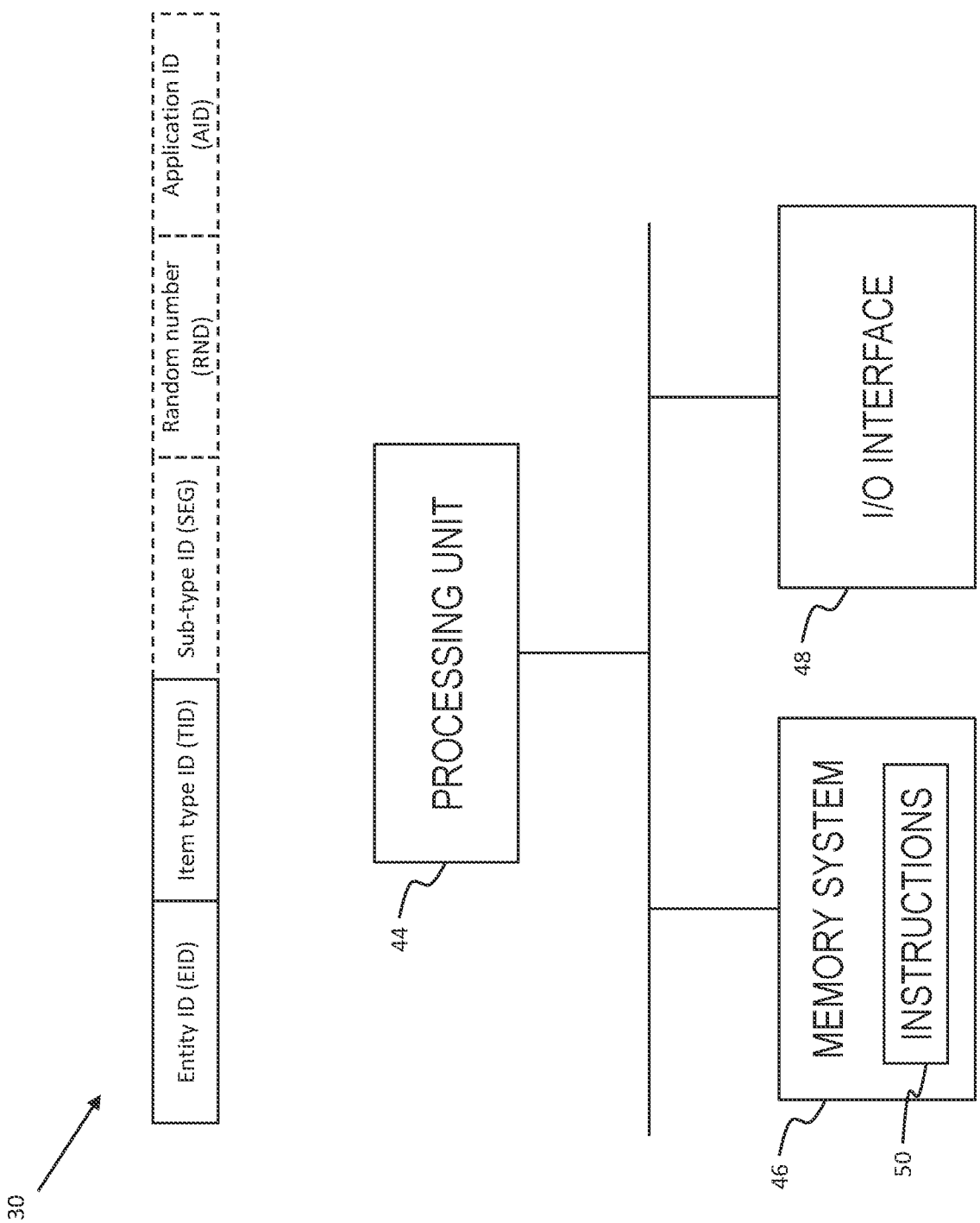

METHOD AND SYSTEM OF PERFORMING AN OPERATION ON A SINGLE-TABLE, MULTI-TENANT DATABASE AND PARTITION KEY FORMAT THEREFOR

TECHNICAL FIELD

This specification pertains to the field of high volume database operation, and more specifically single-table, multi-tenant databases.

BACKGROUND

With the rapid progress in telecommunications seen in the last decades, it is becoming more and more common for businesses to rely on the Internet generally for their daily operations, and cloud storage in particular for managing the various data items associated to such operations.

The main functionalities of a database are associated with the addressing of the data items it contains, and the flexibility and speed at which the data items can be accessed, updated, or written. In the 1970s, SQL (Structured Query Language) was developed in parallel with multiple, relational table design as a way of optimizing the usage of physical storage space. However, over time, the cost associated with the speed of access has become greater than the cost associated with storage space for many applications, and NoSQL (Not-only-SQL) approaches to addressing data items and performing queries are now gaining in popularity.

While existing database storage access schemes have been satisfactory to a certain degree, there remains room for improvement in terms of security, costs, latency and throughput, and/or for adapting to new use cases.

SUMMARY

In accordance with another aspect, there is provided a computer-implemented process of formulating a database call to a database having a plurality of data items stored in corresponding partitions of a non-transitory computer-readable memory system, the plurality of data items being arranged in a single table design, and being associated to different entities, the method comprising: an application programming interface (API) computer receiving an entity request from an entity computer, the entity request identifying a requesting entity and specifying an operation to be performed in the database, generating a database call based on the entity request, the database call including a partition key having a partition key format including a sequence of a plurality of frames, wherein a first of said frames is an identifier of the entity (EID), and a second one of said frames is an identifier of the type of data (TID).

In accordance with yet another aspect, there is provided a computer-implemented method of locating a data item in a database having a plurality of data items stored in corresponding partitions of a non-transitory computer-readable memory system of a database computer, the plurality of data items being arranged in a single table design, and being associated to different entities, the method comprising: receiving, from an application programming interface (API), a database call including i) an identification of an operation to be performed in the database, the operation to be performed including at least one of reading, writing, updating and deleting a data item in the database, and ii) a partition key being associated the data item, performing a hashing function on the partition key to associate one or more of said partitions to the data item, and performing the operation on the one or more of said partitions.

Many further features and combinations thereof concerning the present improvements will appear to those skilled in the art following a reading of the instant disclosure.

DESCRIPTION OF THE FIGURES

In the figures,

FIG. 2 is an example partition key format which can be used in the database access scheme of FIG. 1;

FIG. 3 is a block diagram of an example computer which can be used as one or more of an entity computer, an API computer, and/or a database computer in the database access scheme of FIG. 1.

DETAILED DESCRIPTION

Figure 1:
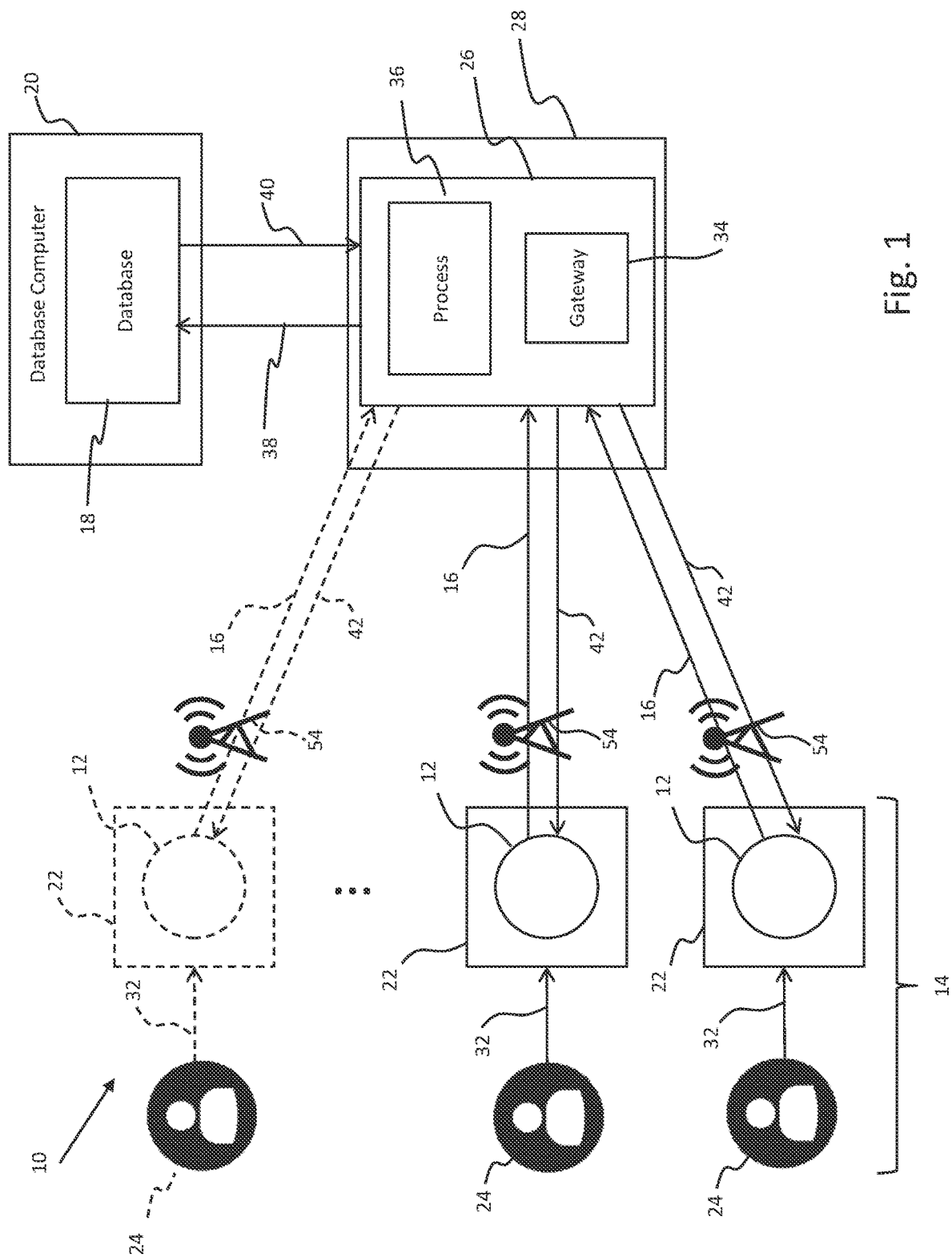
FIG. 1 is a schematic diagram of an example of a database access scheme by a plurality of entities.
Figure 4:
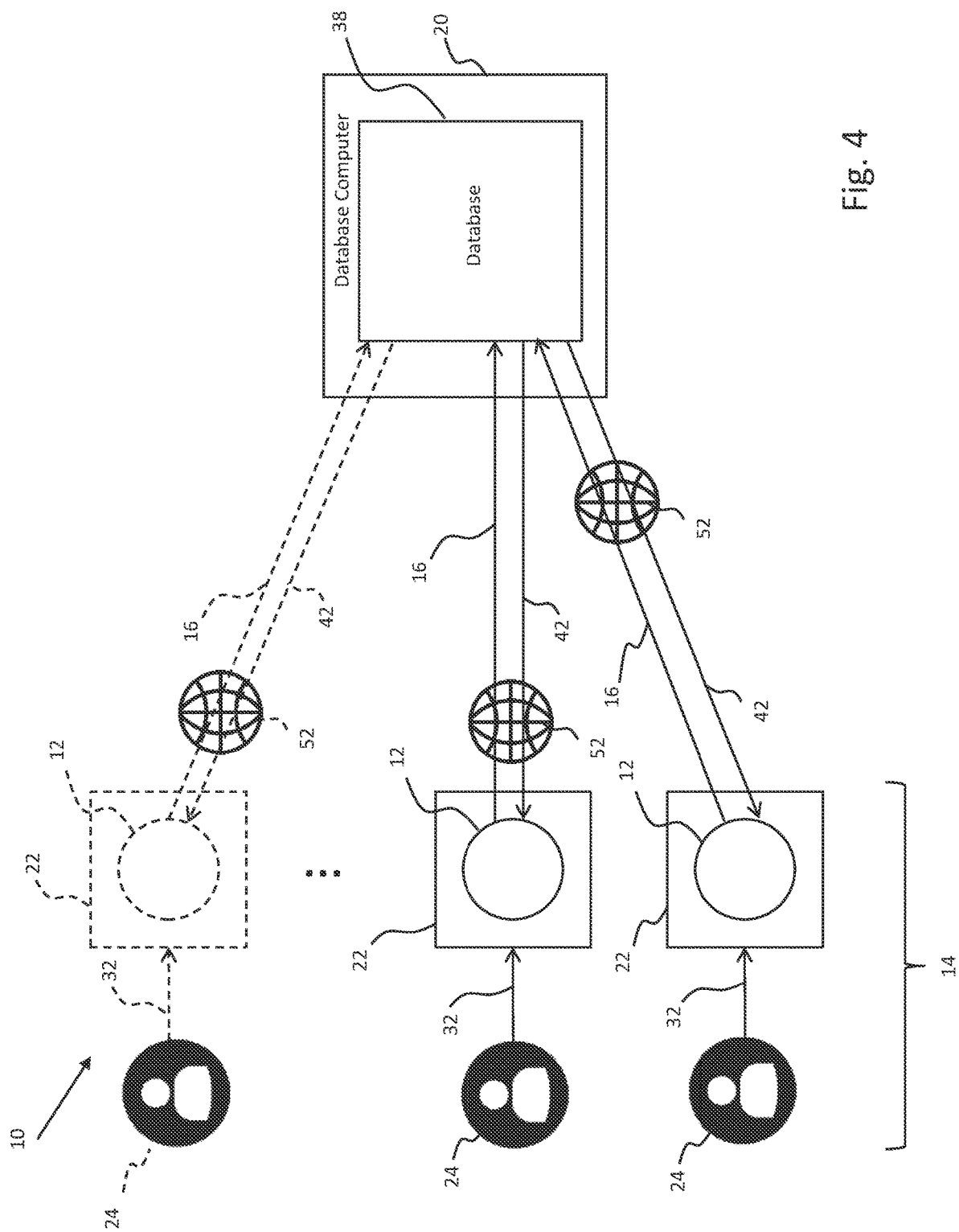
FIG. 4 is a schematic diagram of another example of a database access scheme by a plurality of entities.
Figure 5:
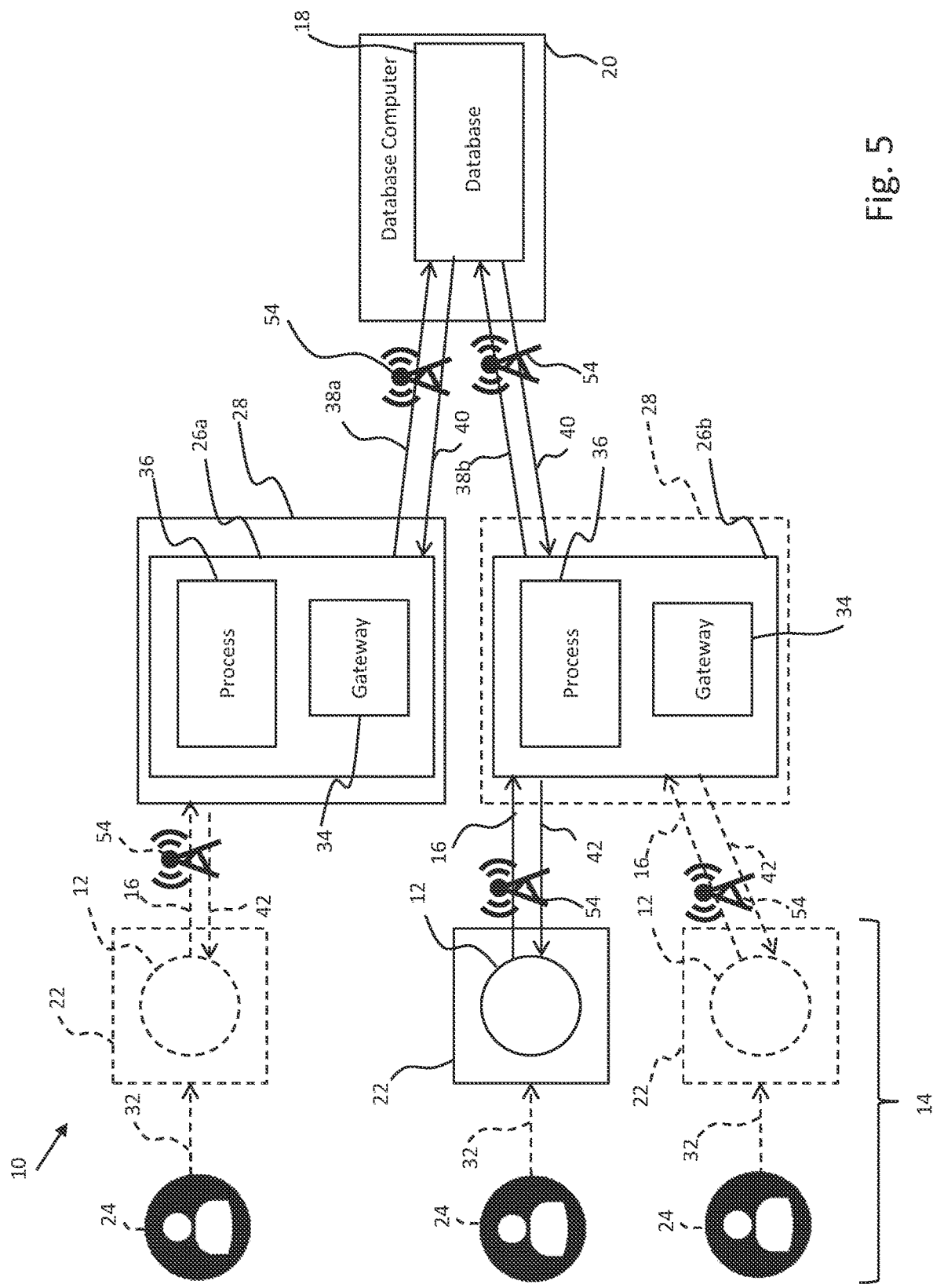
FIG. 5 is a schematic diagram of yet another example of a database access scheme by a plurality of entities.

FIGS. 1, 4 and 5 show different examples of a multi-tenant, single table database access scheme 10, which can potentially be scaled to a large number of data items for a large number of entities 14, and be used by different software processes/applications (app) 12. In a database access scheme 10, the different entities 14 generate requests 16 ("entity requests") to perform operations (e.g. write, update, read or delete) pertaining to data items in a database 18. In a single table database access scheme 10, the requests 16 are associated to partition keys which are used to attribute respective physical storage space to different ones of the data items.

The database 18 can have a database computer 20 with a significant computer memory capability which is to be accessed by different entities 14. The database computer 20 can be available to the entities via a telecommunications network 54 such as the Internet, in which case it can be referred to as a "cloud storage". In a cloud storage scheme adapted to manage data items of various entities 14, it can be desired to provide the capability for each entity 14 to access the database 18 via one or more computers, each of which can be referred to as an entity computer 22. The entity 14 can be a natural person 24 (e.g. a user), a tenant (e.g. company or project), or a software application, to name some examples, and it can be desired to restrict the access to some of the data items in the database 18 to one or more of the entities 14. The expression "multi-tenant database" can be used to describe a cloud storage scheme adapted to manage data items of various entities 14 which may or may not trust one another. Depending on the scheme, the entity 14 can access the database 18 directly, i.e. using the entity computer 22 which communicates with the database 18 such as in the example of FIG. 4, or via an intermediary process which can be an application programming interface (API) 26. FIG. 4 further shows an embodiment where the telecommunication network 54 is the internet 52, such that an entity 14 communicates with the database 18 via the intermediary of the internet 52. It is understood that in alternate embodiments, the entities 14 can communicate via a direct line or any other type of communication network 54. The API 26 can run on a API computer 28 which can be distinct from both the entity computer 22 and the database computer 20. The API computer 28 can be owned by the database provider, or by another owner such as an entity or a third-party service provider.

In the embodiments presented in FIGS. 1, 4 and 5, it was desired for the database access scheme 10 to provide for multiple entities 14, and for the database access scheme 10 to allow suitable scalability in terms of possibilities of increasing an amount of entities 14 and an amount of data items being managed by the database access scheme 10 over time. In one embodiment, single table database design was selected, as opposed to multiple table, relational, database design. In the single table database context, the request sent to the database 18 by the entity 14 wishing to access the database includes a partition key.

The database 18 can have a hashing function to associate physical locations to data items based on the partition key. Accordingly, the partition key can be used to associate one or more physical storage location, in the database 18 to a data item (or to a portion of a data item). In a multi-entity, high access rate environment, the structure of the partition key can have a significant effect on latency and security.

Each partition key can be associated to a data item, which can in fact be a collection of items. Each item can be composed of one or more attributes. An attribute can be a fundamental data element, which does not need to be broken down any further. Accordingly, an order can be a data item which includes a plurality of attributes such as an order date, an order time, an ordering party, an item type, an item quantity, a cost, all of which being attributes of the "order". A given plurality of orders, such as a group of orders of a same ordering party for instance, can be grouped as a collection of data items and be associated to a single partition key. A database 18 can have a limit to the size of the "items" stored in a given "partition", and in some cases, a collection of items having a size greater than the maximum partition size can be broken down into related portions and attributed a set of partition keys in which each partition key of the set is associated to a given one of the item collection portions. In the latter context, the item collection portions can also be considered to be "data items".

While it is fundamental that partition keys be different for different data items stored in the database 18 at any given time, a partition key will typically have a given data structure, referred to as a format, in terms of what different ones of the bits forming the sequence of bits of the partition keys are associated to.

An example partition key format 30 is presented in FIG. 2. It was found, in particular, that in a multi-tenant, single table database access scheme used in a high volume scenario, using a partition key format 30 beginning with the entity ID (EID), followed immediately by an item type ID (TID), could significantly improve latency, and also be beneficial from the point of view of security. This can be very useful, for instance, to help physically grouping items of a given entity 14, and of a same type, (and which are thus more likely to be accessed simultaneously within a given time frame) close to one another, which can improve latency. This can also be useful to add a layer of security, such as by prefix-based access control, where an entity is only allowed to access items which have a given prefix, such as beginning by the entity ID or beginning by the entity ID immediately followed by the item type ID, which can provide a practical way of limiting user access to their own items or even to items of a given type within an entity 14.

Additional elements can provide additional capabilities. In particular, when a multiplicity of applications 12 can require access to the database 18, such as to write, update, read or delete the data, integrating an identifier of the application 12 as part of the data structure can be very significant, however, there may not be any substantial advantage of positioning the application ID (AID) in the beginning of the structure, and it can therefore be preferred to position the application ID as a suffix, or otherwise towards the end of the partition key. It can also be useful to provide for sub-group capability of certain item types. This can be achieved by using a larger item type ID and/or by using a separate identifiers, such as a sub-type identifier (SEG) for instance, after the item type ID in the partition key format 30. It was also found that adding a random number (RND) in the partition key format 30 could help in distributing larger item collections over more than one partition, at the cost of requiring simultaneous reads, for instance.

Henceforth, in accordance with one aspect, there is provided a partition key format 30 for allocating partitions to data items in a single table database 18, where the data items are owned by different entities 14. The partition key format 30 includes a sequence of a plurality of frames, wherein a first of said frames is an identifier of the requesting entity (EID), and a second one of said frames is an identifier of the type of data item (TID).

In the example presented in FIG. 1, the database 18 is of the <<transactional>> type, and the access scheme thus generates operations such as search, create (write), read, update, or delete data items in the database 18. The stored data is not of the analytic or time series type. The database 18 is multi-tenant, which is used herein to refer to a database 18 that may be used/accessed by various entities 14. Access to some data items may be restricted to one or some entities 14. In such a database, the partition key can be an integral part of a <<querying>> operation. Querying refers to addressing specific data items only, based on some conditions, as opposed to scanning all items in the database 18. Security can be a core aspect of multi-tenant, single table database access scheme. Another core aspect, for the scheme to be able to scale and meet high intensity usage, is efficiency of data access (limiting latency), but security must intrinsically be taken into consideration and imposes a cost on efficiency. Another aspect which can guide efficiency is that in a multi-tenant 14 architecture, it is more likely that multiple applications 12 will be used to perform operations on the database 18 by the same, or different entities. This causes variations in data access schemes and item collection sizes. It can be desired to optimize query & read/write latency while simplifying tenant and item collection security.

The entity computer 22 can be provided with a database access software application 12 configured to interface with the database 18 via an application programming interface 26 (e.g. FIG. 1 and FIG. 5), or directly (e.g. FIG. 4). More specifically, the database access software application 12 can be configured to collect an entity input 32, such as an input from another app running on the same entity computer 22, another computer, from a natural person 24 directly via the access software application 12 or via another app running on the same entity computer 22, etc. The database access software application 12 can be configured to formulate an entity request 16 based on the entity input 32. The entity request can be a request to create, read, update (modify), or delete one or more data items in the database 18. In the example presented in FIG. 1, the entity request can be communicated over the Internet 52, through a direct line or through any other type of telecommunication network 54, for instance, and received by a database interface software application which will be referred to herein as an application programming interface (API) 26. The API 26 runs on a computer which is distinct from the entity computer 22, and which can be referred to herein as the API computer 28. The database 18 also has software which runs on a computer, which can be the same computer as the API computer 28, or a different computer which can be referred to as the database computer 20. The API 26 can control entity access to the database 18 via a gateway 34, for instance. The API 26 can include a process 36 configured to generate a request to perform an operation on the database 18, which can be referred to as a database call 38 in this example, and which can be based on the entity request 16. The database call 38 is received by the database 18, and the software of the database can proceed with the request, which typically involves performing hashing function on a partition key to physically attribute a partition location to the request. The database 18 can provide some form of feedback to the API 26, which can be referred to as a database reply 40, and the API 26 can provide some form of feedback 42 to the entity computer 22 for each entity request 16. The feedback 42 can include a simple confirmation that the operation was performed, or actually relay read data, for instance.

In one example, the database 18 can be the DynamoDB database from Amazon Web Services (AWS), for instance, or another suitable database. In the context of the DynamoDB database, the gateway 34 can be referred to as the API gateway and the call process 38 can be referred to as the Lambda (A).

Independently of the exact service provider, the database 18 can have a plurality of data items stored in corresponding partitions of a non-transitory computer-readable memory system, the plurality of data items being arranged in a single table design, and being associated to different entities. Several entities 14, such as a natural users 24 and/or applications for instance, may request to access different ones of the data items which are all stored in a single table simultaneously. Such entities 14 will do so via respective computers, which will be referred to herein as "entity computers" 22 for the sake of simplicity. These computers 22 can be desktop computers, tablets, smartphones, electronic devices integrated to delivery trucks, servers, etc. A software application, which will be referred to herein as an entity application 12 for simplicity, runs on the entity computer 22, receives an input 32, and formulates a request 16 to the database 18. In the scenario where the entity 14 communicates with the database 18 via an API 26, the entity's 14 request can be referred to as the entity request 16. The entity request 16 can include an identification of the requesting entity 14, a type of operation to be performed in the database 18 (e.g. write, read, update, delete), and a type of data item to which the operation pertains. In the case of a write (create) operation, the entity request 16 can also include the data to be stored, for instance. The entity request 16 can be communicated over the Internet, directly or through any other type of telecommunication network 54, for instance.

In the example scenario of FIG. 1, another software application, which can be an application programming interface (API) 26, can receive the entity request 16 and formulate a request to perform an operation on the database 18 which can be referred to as a database call 38 in this example. In this scenario, the API 26 can generate the partition key, onto which an application of the database typically performs the hashing operation to associate a physical partition attribution to the data item.

In practice, the API computer 28 can have a distinct programming facility than the entity computer 22 or than the database computer 20, but alternate schemes are possible. For instance, in one alternate example, the API 26 runs on the same computer than the database application. In one alternate embodiment, shown in FIG. 5, the partition key can be generated by one of many API's 26a, 26b which can formulate database calls 38a, 38b to the database 18 in parallel. In yet another alternate example, shown in FIG. 4, entity computers 22 can be equipped with software configured to generate the partition key and communicate with the database 18 directly, for instance. In the latter example, a process separate from the process which generates the partition key can also run on the entity computer 22 and formulate an entity request, and the entity request can be stored in non-transitory memory directly on the entity computer, later to be accessed by a distinct process which generates the partition key and/or the request to perform the operation on the database, for instance.

In one example, the database 18 is the DynamoDB database, and the API 26 is the lambda process which can receive an entity request 16 via the Internet.

Using a scheme such as shown in FIG. 1 instead of the scheme as shown in FIG. 4 or 5 can be preferable from the standpoint of security in some applications. Indeed, in practice, the entity request 16 can also formulate a token which is authenticated by the API 26, and access to the database 18 is provided contingent upon authentication. The token can be controlled by an authenticator service (such as AutheNZ for instance), which needs to be accessed by the entity computer 22 before accessing the database 18. Notwithstanding the above, the partition key format presented below can also be useful, and perhaps even more so, in a scheme such as presented in FIG. 4 or 5.

Referring back to the example of FIG. 1, the API 26 can be responsible for generating a database call 38 based on the entity request 16. The database call 38 can include an indication of the operation to be performed in the database 18, and a partition key. The partition key can have a partition key format including a sequence of a plurality of frames. The API 26 then proceeds to transmit the database call 38 to the database 18 on behalf of the requesting entity 14.

The database 18 then receives the database call 38 from the API 26, performs a hashing function on the partition key to associate one or more of the partitions to the data item, and performs the operation on the one or more of the partitions.

Typically, once the operation is performed, the database 18 sends feedback back to the user, such as the natural person 24. This can be done via the API 26 and the entity computer 22, for instance, using the same mode of communication than the one which was used to convey the entity request 16 and the database call 38.

In one embodiment, the format of the partition key is in the RFC 4122 format including a sequence of 5 frames of 8, 4, 4, 4 and 12 hexadecimal characters, respectively. This format can be useful for verification purposes, for instance. The frames can be as follows, for instance: the first one of the frames can be an identifier of the entity (EID), the second one of said frames can be an identifier of a type of the data item (TID), such as a schema identifier denoting the structure of the item, the third frame can be an identifier of a sub-type of the data item (SEG), such as a unique segment of a higher order item to which the item belongs, the fourth frame can be a random number (RND), and the fifth frame can be an identifier of a requesting application (AID), such as a unique identifier for an application or microservice which created the stored item, forming:

{EID:8}-{TID:4}-{SEG:4}-{RND:4}-{APP:12}=36 CHARS.

The random number (RND) can be a randomly assigned shard number between 0 and "N" (represented in base-16), where "N" is defined as the minimum performant shard value, for instance.

This exact preferred configuration is very specific. It will be understood that the exact solution can vary depending on many factors such as a) the type of data usage considered and b) particularities of the database structure and/or its security scheme.

In one specific embodiment, the platform is designed to allow users such as suppliers and consumers of bulk material orders and deliveries to transact with one another, and the solution is implemented on the DynamoDB database from Amazon Web Services (AWS). The exact solution can vary in alternate embodiments.

For instance, in the context presented above, it was found very convenient for the partition key to use RFC 4122 format, which determines a presence of 5 groups having the respective sizes (number of hexadecimal characters) in that order. This format is optional, but can be preferred if it is suitable in one potential data access scheme (appropriate size to cover expected amount of practical applications), because it can be easily recognized and easily validated.

A potential core can be somewhat simpler, and can be presented as being the use a partition key which begins with the entity ID, followed by the item type ID, and even the sizes of these elements can vary from one application to another.

To a certain extent, this core proposal may be useful in databases other than DynamoDB. It nonetheless appears to be particularly well adapted to DynamoDB because 1) in DynamoDB partition key governs how item collections are physically organized in the underlying physical memory structure, and 2) certain DynamoDB security features allow or deny access to item collections based on prefixes. It will be understood that the core proposal can be particularly useful in other databases than DynamoDB, particularly where such databases also have features similar to those exposed above. Indeed, the techniques can be applied to any type of database with certain underlying capabilities. Performance and security characteristics will vary by database. For instance, a single table design can be implemented satisfactorily, to a certain extent, in a SQL server using a security scheme such as RLS (row-level security) for SQL Server for instance, which can be considered functionally comparable for relatively small systems, but would encounter challenges when attempting to scale beyond a certain extent.

It will be understood that in alternate embodiments, some of the other elements may switch places relative to one another, and may even be omitted entirely. The following text explains the relative essentiality of each portion of the proposed partition key format in a DynamoDB-like context.

Entity ID (EID) can be a identifier allowing to uniquely identify an entity which is requesting access to the database. A tenant is one kind of entity, user is another, Application is another, etc. The entity ID can be made part of the partition key because in a multi-tenant database, it can be required essential to associate data (items) to owners (entities). In a single table design, you do not have separate tables for different entities or item types, so the identification of the entity can become an integral part of searching for data, and thus of the partition key format. Security aspects become superposed to the strict search requirements. The entity ID needs to be somewhere in the item for access to the item to be ultimately be restricted by the entity, and including the entity ID in the partition key can provide greater scalability and security. An alternative is pure application level security which can also be employed on top of native database security, but including the entity ID in the partition key can make the solution more tamper-proof. The positioning of the entity ID at the beginning of the partition key can have one or both of the following advantages: improving efficiency (reducing latency), and improving security.

The NoSQL databases typically use a hashing algorithm on top of the partition key to determine where data physically resides (which SSD, HDD, file system, etc). Using the EID at the beginning of the partition key can allow to get more related data on the same chip & cache data in memory, and there can be an efficiency gain that data from same entity be located physically close to one another. Moreover, positioning the EID at the beginning allows to secure all customer data with a single permission, while still allowing security to be more fine-grained. Indeed, by putting entity ID first, you can easily allow access to only a given entity's data by controlling the access via the partition key. If you would put a frame that changes before the entity ID, this may require to update the security permissions everytime you add a new schema, or otherwise said, positioning the entity ID at the beginning may allow more consistent use, and less updating of security settings. These features were discussed here in the context of how the DynamoDB physically allocates items and the way DynamoDB applies security, but a similar solution may be readily applicable to a different database, which works in a somewhat similar manner.

The size of the entity ID frame can vary from one embodiment to another, and depends on the use case. In one embodiment, 8 characters can be considered an interesting number. The size of the entity ID ultimately governs the maximum number of entities, so an embodiment having a lesser number of entities may not require as many characters. Between 2 and 12 hexadecimal characters can likely cover most if not all use cases. The use of 8 characters is of particular interest because it fits the RFC-4122 UUID standard format.

The item type identifier (TID) can be made part of the partition key since in a single table design it can be perceived as forming the equivalent of different tables by defining the type of item. It can be preferred to put it in the second frame, right after the entity ID, in light of the security strategy, which can be important in a multi-tenant design. In this context, the core elements can be placed at the beginning in a prefix-based security scheme. The Entity ID and the Item type ID can be considered to form the core of partition key format. Putting the entity ID before schema ID can allow security to be applied to the entirety of an entity's item collection and may affect the locale of stored item collections depending on the hashing algorithm used. In one example security scheme, if you would put the schema id before the entity ID, you would need to update the security permissions each time you add a schema, and it may be desired for the entities to be able to add a schema anytime, making such an approach undesirable. Such an approach could also prevent from securing an entity's entire item collection without continually updating the security policy which, as some point, can also have a limitation on size.

The size of the item type ID governs the possible number of schemas. On the one hand, you want to limit size because that can accelerate efficiency and security, but on the other hand you need to have enough schemas for your use scenario and to allow plenty of room to increase the amount of schemas over the years, based on the need. It can be preferred to supplement the item type ID (TID) with sub-categories (see sub-type ID (SEG) below) for more versatility in some embodiments, this can allow to reduce the number of schemas, while still allowing a logical order to related data. For instance, the schema can identify the type of item as an order, and several SEG's can be used to divide type of ordered items, for instance.

In summary, in one embodiment, the prefix can group data together but the more likely scenario, the entire partition key is needed to determine the partition. Even in that scenario a database 18 can have adaptive partitioning where a single key can be moved to an isolated partition without regard to the default hashing algorithm. The entity ID (EID) and item type ID (TID) can form the core of a multi-tenant, single-table design. The first one identifies the entity and serves to group an entity's data items close to one another and easily access permissions, the item type ID (TID) determines the type of data it is. Positioning EID and TID at the beginning of partition key can have numerous advantages, and can represent a valid and commercially interesting design.

The Application ID (AID) can be used to identify the app which generates the data item in a multi-application scheme. In the context of this specification, app is a short expression for software process. In practice, a single software program, or a portfolio of programs, can have a number of independent processes (or modules) which can create data items, and it may be relevant to have the information about the individual process which created the data item somewhere in the partition key. For example, for large customers who generate a lot of data across applications, it's critical that the size of any given item collection be limited to within guidelines provided by the database. Assuming multiple applications exist that create data, it's relevant to be able to secure all data belonging to a customer—thus the EID+TID prefix approach can work well. However, performance may not be optimized in the case where the sum of all item collections of a given type for all applications exceeds the recommended maximum. Therefore, it's practical to further partition the data by the process that created it. This can be convenient in multi-tenant, multi-process, single table architectures.

Since many different clients may use the same app to generate data items, there is no particular relevance to give the AID a strategic position in the partition key format. The 12 character slot at the end of the RFC 4122 format seems suitable, since it also provides for a vast variety of potential unique application identifiers. This can be relevant since programs are broken down into multiple processes (apps), and some entities may even have their own programs.

Accordingly, it can be useful to include an AID in the partition key format, and to have a sufficient size to cover a reasonable expected amount of apps which may arise during several years of use. Positioning the AID at the end may be more desirable in some applications where, during normal data query or retrieval, the AID is fixed whereas the other segments vary.

The item sub-type identifier (SEG) can be made part of partition key since the segment is essentially an extension to the TID, and can allow to create sub-categories amongst types of items. In alternate embodiments, it can be omitted, and substituted by a TID of a larger or smaller size. Some embodiments will prefer using a SEG for visual convenience when supporting systems with a hierarchical data taxonomy or when item types are repeated for different parents and, thus, have different physical schemas. Positioning the SEG before the random number can allow to avoid having to change security permissions if you increase the size of the random number. The size of the SEG can be freely modified, adopting the RFC 4122 format can allow the partition key to be easily verifiable, is compact enough to support practical numbers of applications without being too long, and if adopting that format, positioning SEG as third element, 4 characters, can be suitable in an example data storage/retrieval scheme. The size can be selected to be large enough to support the largest anticipated item collection.

In sum, the SEG is likely useful to allow breaking down schemas into different sub-types, and this can be useful when capped in terms of item size for instance. DynamoDB, for instance, limits item collections at 4 k. If a given order (schema) has 100 items, it may be necessary to break that order down. Using a separate key structure slot can be practical, but easily substitutable by random number or larger SID structure. Also, visual convenience when supporting systems with a hierarchical data taxonomy or when item types are repeated for different parents and, thus, have different physical schemas.

A random number (RND) can be made part of the partition key format to facilitate the division of data sets which are larger than database vendor recommended partition sizes. In DynamoDB, for instance, the recommended maximum partition size is 10 GB. If related data is larger than that, it can be distributed over a number of partitions. This can also allow to distribute data which would be accessed very frequently, to avoid too much contention on a given partition. DynamoDB, for instance, is limited in terms by reading 3000 items per second and cannot go above this value in any partition. As an example, a large customer in the delivery business with, for example 1300000 deliveries in a month, with 10 delivery status updates on each delivery, can generate 13 millions reads and writes. Eventually a limit may be reached in terms of how many items can be efficiently stored under one partition key. Random number provides flexibility to the partition key and can allow to more easily distribute the data. The maximum number of different values of the random number can be limited to a number n, which can be lower than the amount of combinations afforded by the associated number of bits. The number n can be selected based on client size. The random number is optional, but leaving it out of the partition key may eventually limit performance. Partitions with the same partition key will typically be physically close to one another and easy to access. By putting random number as close as possible to the core (EID+SID), the information may be stored in partitions which can easily be accessed at a given time. Different schemes are possible, and if it is desired to retrieve a piece of information and it is unknown which one of the partitions has it, it can be desirable to read all three simultaneously for instance and make sure to retrieve the relevant information quickly.

In one embodiment, the optimal size of the random number depends on the item type (size), and expected usage, it can depend on APP for instance. If the random number is too high, the related data will be separated more than necessary. If the random number is too low, it will not be possible to spread related data on enough partitions to cover it entirely. It can be desired, while giving the random number a maximum size and predetermined location within partition key format, to limit the amount of possible values of the random number actively depending on the expected usage/need. For instance, apps which are known to generate items which regularly need to be partitioned into not more than 4 partitions can have a random number capped at a maximum of 4.

Accordingly, similarly to SEG, RND can be useful in distributing data more efficiently, but it is to be understood that such format framess are not essential. Such frames may, however, be useful in some embodiments where it is desired to support arbitrarily large item collections.

It will be understood that in this specification, the expression "computer" is not to be interpreted in a limiting manner. It is rather used in a broad sense to generally refer, as schematized in FIG. 3, to the combination of some form of one or more processing units 44, some form of memory system 46 accessible by the processing unit(s) 44, and some form of input/output interface 48. The memory system 46 can be of the non-transitory type. For simplicity only one computing device is shown but a computer may include more computing devices operable by users to access remote network resources and exchange data. The computing devices may be the same or different types of devices. The use of the expression "computer" in its singular form as used herein includes within its scope the combination of a two or more computers working collaboratively to perform a given function. Moreover, the expression "computer" as used herein includes within its scope the use of partial capabilities of a given processing unit.

The computer components may be connected in various ways including directly coupled, indirectly coupled via a network 54, such as through the internet 52, and distributed over a wide geographic area and connected via a network (which may be referred to as "cloud computing").

For example, and without limitation, a computer may be a server, network appliance, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the methods described herein.

A processing unit 44 can be embodied in the form of a general-purpose micro-processor or microcontroller, a digital signal processing (DSP) processor, an integrated circuit, a field programmable gate array (FPGA), a reconfigurable processor, a programmable read-only memory (PROM), to name a few examples.

The memory system 46 can include a suitable combination of any suitable type of computer-readable memory located either internally, externally, and accessible by the processor in a wired or wireless manner, either directly or over a network such as the Internet. A computer-readable memory can be embodied in the form of random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) to name a few examples.

A computer can have one or more input/output (I/O) interface 48 to allow communication with a human user and/or with another computer via an associated input, output, or input/output device such as a keyboard, a mouse, a touchscreen, an antenna, a port, etc. Each I/O interface 48 can enable the computer to communicate and/or exchange data with other components, to access and connect to network resources, to serve applications, and/or perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, Bluetooth, WiMAX), SS7 signaling network, fixed line, local area network, wide area network, to name a few examples.

It will be understood that a computer can perform functions or processes via hardware or a combination of both hardware and software. For example, hardware can include logic gates included as part of a silicon chip of a processor. Software (e.g. application, process) can be in the form of data such as computer-readable instructions 50 stored in a non-transitory computer-readable memory accessible by one or more processing units. With respect to a computer or a processing unit, the expression "configured to" relates to the presence of hardware or a combination of hardware and software which is operable to perform the associated functions.

As can be understood, the examples described above and illustrated are intended to be exemplary only. The scope is indicated by the appended claims.

What is claimed is:

1. A computer-implemented method of performing an operation in a database having a plurality of data items stored in corresponding partitions of a non-transitory computer-readable memory system of a database computer, the plurality of data items being arranged in a single table design, data items of the plurality of data items being associated to different entities, the method comprising:
   receiving, from a requesting computer, a request for performing an operation in the database, the request including:
   i) a type of the operation, including at least one of searching, reading, writing, updating and deleting a data item in the database, and
   ii) a partition key associated with the data item, the partition key having a partition key format including a sequence of frames, wherein a first one of said frames in the sequence is an identifier of one of the different entities (EID), and a second one of said frames in the sequence is an identifier of a type of the data item (TID), and wherein one of said plurality of frames is a random number,
   performing a hashing function on the partition key to associate one or more of said partitions to the data item, and
   performing the operation in the one or more of said partitions, and wherein the request includes a plurality of related partition keys, said partition keys being identical to one another except for the random number, wherein said performing the hashing function includes associating each of said related partition key to a respective partition, and said performing the operation includes performing the operation simultaneously on all said partitions.

2. The computer-implemented method of claim 1, further comprising: providing feedback to the requesting computer including an indication that the operation has been performed.

3. The computer-implemented method of claim 1 wherein the request is received from a requesting application hosted on the requesting computer, and one of said frames of said partition key format is an identifier of a requesting application (AID).

4. The computer-implemented method of claim 2 wherein the AID is a final frame of the partition key format.

5. The computer-implemented method of claim 1 wherein one of said plurality of frames is an identifier of a sub-type of the data item (SEG).

6. The computer-implemented method of claim 5 wherein the identifier of the sub-type is a third frame of the partition key format.

7. The computer-implemented method of claim 1 wherein the random numbers are selected within a space of numbers being larger than a number of said related partition keys.

8. The computer-implemented method of claim 1 wherein the format of the partition key is in the RFC 4122 format including a sequence of 5 frames of 8, 4, 4, 4 and 12 hexadecimal characters, respectively.

9. The computer-implemented method of claim 1 wherein a third frame is an identifier of a sub-type of the data item (SEG), a fourth frame is a random number (RND), and a fifth frame is an identifier of a requesting application (AID).

10. A computer-implemented method of making a request for performing an operation in a database, the database having a plurality of data items stored in corresponding partitions of a non-transitory computer-readable memory system, the plurality of data items being arranged in a single table design, data items of the plurality of data items being associated to different entities, the method comprising:
   generating the request for performing the operation in the database, the request including:
      i) a type of the operation to be performed in the database, the type including at least one of searching, reading, writing, updating and deleting a data item in the database;
      ii) a partition key associated to the data item, the partition key having a partition key format including a sequence of frames, wherein a first of said frames is an identifier of one of said different entities (EID), and a second one of said frames is an identifier of a type of data item (TID), and
   transmitting the request to the database,
   wherein the request includes a plurality of related partition keys, said partition keys being identical to one another except for the random number, wherein said performing the hashing function includes associating each of said related partition key to a respective partition, and said performing the operation includes performing the operation simultaneously on all said partitions.

11. The computer-implemented method of claim 10, wherein said generating and transmitting the request is performed by an application programming interface (API) hosted on an API computer.

12. The computer-implemented method of claim 11 further comprising, prior to said generating, the API computer receiving an entity request from an entity computer via the Internet, the entity request identifying at least a) the requesting entity, b) the type of operation to be performed in the database, and c) the type of data item to which the operation pertains.

13. The computer-implemented method of claim 12 further comprising providing feedback to the entity computer, the feedback including an indication that the operation has been performed.

14. The computer-implemented method of claim 10 further comprising: receiving feedback from the database including an indication that the operation has been performed.

15. The computer-implemented method of claim 10, wherein said generating and transmitting the request is performed by an application hosted on an entity computer.

16. The computer-implemented method of claim 10 wherein and wherein one of said frames of said partition key format is an identifier of a requesting application (AID).

17. The computer-implemented method of claim 16 wherein the AID is the final frame of the partition key format.

18. The computer-implemented method of claim 10 wherein the entity request further specifies an identity of a sub-type of the data item (SEG).

19. The computer-implemented method of claim 1 wherein the different entities are different owners of corresponding ones of the plurality of data items.

20. The computer-implemented method of claim 10 wherein the different entities are different owners of corresponding ones of the plurality of data items.

21. A computer-implemented method of performing an operation in a database having a plurality of data items stored in corresponding partitions of a non-transitory computer-readable memory system of a database computer, the plurality of data items being arranged in a single table design, and being associated to different entities, the method comprising:
   receiving, from a requesting computer, a request for performing an operation in the database, the request including:
      i) a type of the operation, including at least one of searching, reading, writing, updating and deleting a data item in the database, and
      ii) a plurality of related partition keys associated to corresponding data items amongst the plurality of data items, each partition key having a partition key format including a sequence of frames, wherein a first one of said frames in the sequence is an identifier of an entity (EID), a second one of said frames in the sequence is an identifier of a type of the data item (TID), and one of said plurality of frames is a random number, said plurality of related partition keys being identical to one another except for the random number,
   performing a hashing function on the partition key to associate one or more of said partitions to the data item, including associating each of said related partition key to a respective partition, and
   performing the operation simultaneously on all said respective partitions,
wherein the request includes a plurality of related partition keys, said partition keys being identical to one another except for the random number, wherein said performing the hashing function includes associating each of said related partition key to a respective partition, and said performing the operation includes performing the operation simultaneously on all said partitions.

22. The computer-implemented method of claim 21 wherein the random number is selected within a space of numbers being larger than a number of said plurality of related partition keys.

23. A computer-implemented method of performing an operation in a database having a plurality of data items stored in corresponding partitions of a non-transitory computer-readable memory system of a database computer, the plurality of data items being arranged in a single table design, and being associated to different entities, the method comprising:
   receiving, from a requesting computer, a request for performing an operation in the database, the request including:
      i) a type of the operation, including at least one of searching, reading, writing, updating and deleting a data item in the database, and
      ii) a partition key associated with the data item, the partition key having a partition key format in the RFC 4122 format including a sequence of 5 frames of 8, 4, 4, 4 and 12 hexadecimal characters, wherein a first one of said frames in the sequence is an identifier of an entity (EID), and a second one of said frames in the sequence is an identifier of a type of the data item (TID), performing a hashing function on the partition key to associate one or more of said partitions to the data item, and performing the operation in the one or more of said partitions, wherein the request includes a plurality of related partition keys, said partition keys being identical to one another except for the random number, wherein said performing the hashing function includes associating each of said related partition key to a respective partition, and said performing the operation includes performing the operation simultaneously on all said partitions.

* * * * *